G. F. FISHER.
VEHICLE TIRE.
APPLICATION FILED MAY 10, 1915.
1,201,282.
Patented Oct. 17, 1916.
2 SHEETS—SHEET 1.
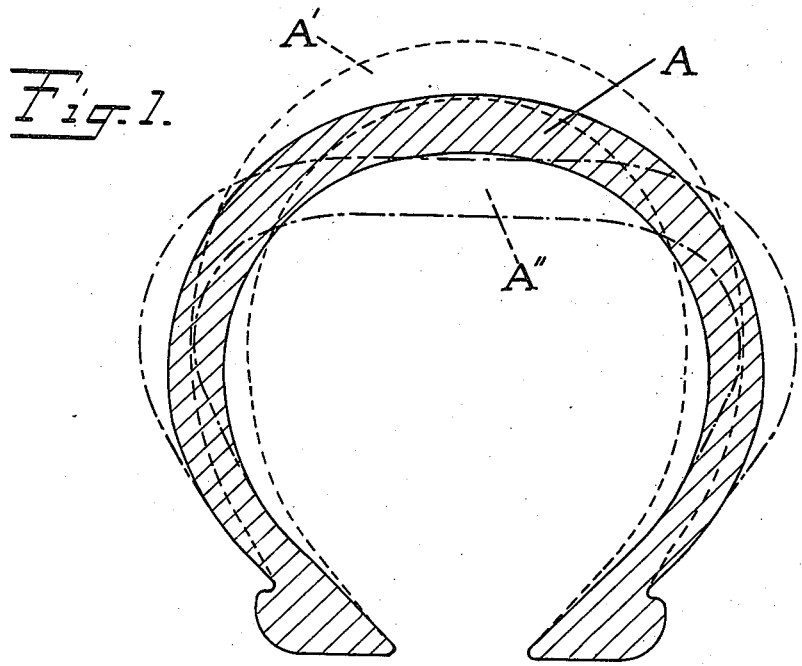
WITNESSES:
INVENTOR
George F. Fisher.
BY
HIS ATTORNEY G. F. FISHER.
VEHICLE TIRE.
APPLICATION FILED MAY 10, 1915.
1,201,282.
Patented Oct. 17, 1916.
2 SHEETS—SHEET 2.
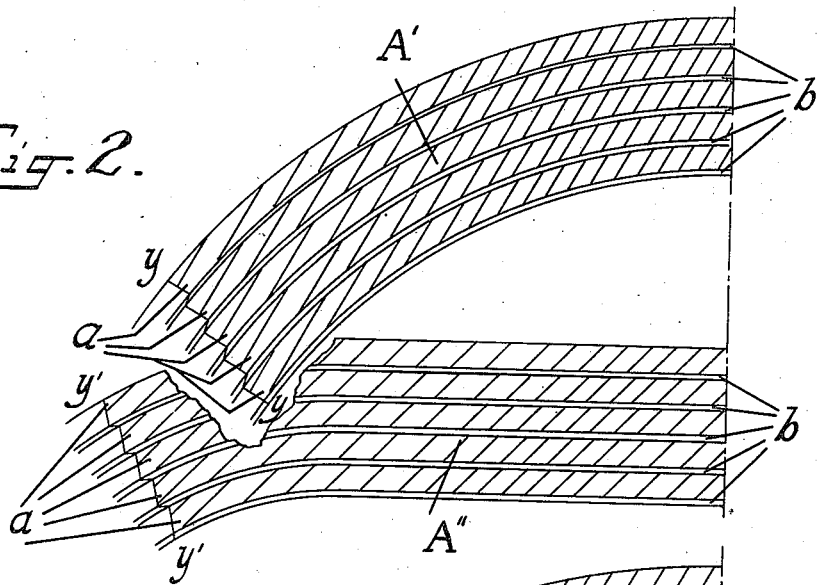
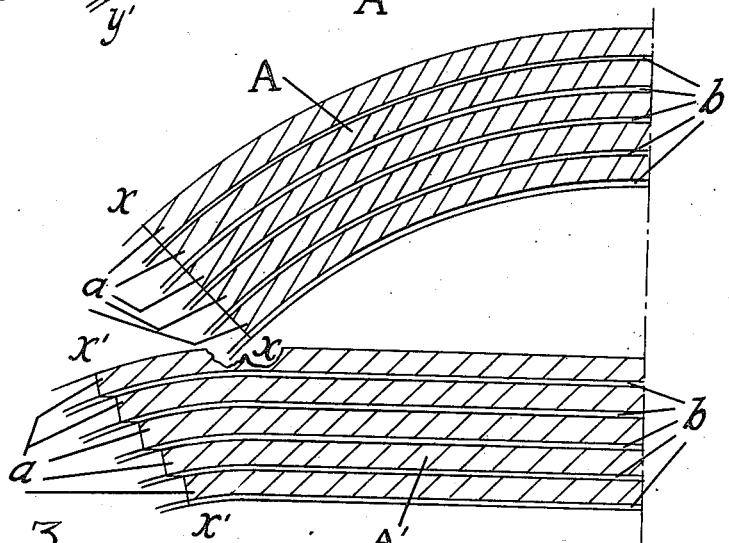
WITNESSES:
INVENTOR
George F. Fisher.
BY
HIS ATTORNEY

UNITED STATES PATENT OFFICE.

GEORGE F. FISHER, OF PLAINFIELD, NEW JERSEY, ASSIGNOR TO MORGAN & WRIGHT, A CORPORATION OF MICHIGAN.

VEHICLE-TIRE.

1,201,282.

Specification of Letters Patent.

Patented Oct. 17, 1916.

Application filed May 10, 1915. Serial No. 27,024.

*To all whom it may concern:*

Be it known that I, GEORGE F. FISHER, a citizen of the United States, residing at Plainfield, county of Union, State of New Jersey, have invented certain new and useful Improvements in Vehicle-Tires, of which the following is a full, clear, and exact description.

This invention relates to pneumatic vehicle tires and has for an object to produce a tire wherein the liability to rupture, consequent upon the separation of the layers of fabric in the carcass, is greatly reduced.

The conventional tire consists of a plurality of plies of rubber frictioned fabric built upon a core or mandrel in the shape it would naturally assume when inflated on a rim, that is, substantially circular in cross-section.

When under load, that portion of a tire which is in contact with the ground will be compressed until the number of square inches of surface in contact with the ground multiplied by the air pressure (in pounds per square inch) equals the load to be supported by that tire. Since the fabric which constitutes the carcass of a tire is inelastic, the concentric plies must, when the circular contour of the tread is flattened by the weight, slip one upon the other, and all the stretching and distortion be concentrated in the only elastic portions of the carcass, that is, the thin layers of vulcanized rubber which join together the fabric plies. Inasmuch as these layers of rubber are of a thickness of from $\frac{3}{1000}$ to $\frac{8}{1000}$ of an inch, and in the conventional tire the stretch therein at the point of maximum slip is about six times that distance, it may be seen that the hold of the rubber on the adjacent fabric plies must give way in a comparatively short time, permitting fabric separation which is inevitably followed shortly by so-called "blow-outs."

My invention consists in building a tire in such a shape that the stretch upon the layers of rubber between the fabric plies caused by flexing of the tire is reduced by about one-half, with a corresponding lengthening of the life of the tire.

For a clearer understanding of this invention, reference is made to the following description and the accompanying drawings, wherein:

Figure 1 is a cross-sectional view of a tire built according to this invention, showing in dotted and in dot and dash lines the respective shapes assumed under inflation and when contacting with the ground; Fig. 2 is a diagrammatic view showing the relative fabric slip in a tire of my construction; and Fig. 3 is a view corresponding to that in Fig. 2 showing the fabric slip in a tire of the usual construction.

In the conventional tire when inflated and not bearing any weight the rubber between the fabric plies is under no shearing stress, this being the shape in which it was built and cured. Therefore, when the load is applied and the tread is flattened from the position A (Fig. 3) to A', the plies $a$ slip, one upon another from the relative position $x$—$x$ to that shown at $x'$—$x'$. Experiment has shown the stretch to the plies of rubber $b$ to be in some instances approximately six times their thickness, or from $\frac{18}{1000}$ to $\frac{48}{1000}$ of an inch, the exact amount varying, of course, with the weight of the load, the diameter of the tire, and the air pressure.

I build my tire on a core the shape of which is midway between the shape when inflated and the flattened shape assumed by the portion in contact with the road, Figure 1 showing in full lines the tire in the shape in which it is built and in dotted and in dot and dash lines respectively, the shapes assumed when inflated and when flattened by the weight of the load. In Fig. 2 I have shown the relative slip of the fabric plies $a$ in a tire made according to my invention, the positions being those of the tire when inflated and when flattened by the load, and indicated in Fig. 1 at A' and A" respectively. To avoid a confusion of lines I have not shown a corresponding enlargement of the uninflated position A (Fig. 1). Thus by inflating the tire it naturally assumes the approximately circular shape of the conventional tire. In so doing however, the fabric plies $a$ must slip on each other and the layers of rubber $b$ are stretched about three times their thickness. Now when the tire is flattened by contact with the ground under the load, the fabric plies $a$ slip, but the rubber, instead of being subjected to a stretch of six times its thickness, is first relieved from a stretch of three times its thickness and then subjected to an equal stretch in the opposite direction. In other words, at every flexing action on the tire the rubber layers b are given two stretches of about three times their thickness, one in each direction, instead of the single stretch of six times the thickness, to which the rubber layers in the conventional tire would be subjected under similar conditions.

While I have taken for an example a condition where the slip of the fabric plies is six times the distance between them, I do not wish to be understood as stating that this is always the case, for of course the weight of the load, the size of the tire, the relative thickness of fabric to the thickness of rubber separating the different plies, and the air pressure in the tire all effect the ratio. However, the slip frequently is as large as I have stated, and serves to illustrate the value of my invention, by which the stretch on the intervening rubber layers is reduced by approximately one-half.

By my construction the life of the tire carcass is practically doubled in that fabric separation is greatly minimized, without loss of resiliency. In fact the resiliency is probably increased.

Having described my invention, what I claim and desire to protect by Letters Patent is:

1. A tire casing comprising a plurality of plies of fabric and having substantially oval or elliptical outline in cross-section when not inflated, said outline being substantially midway between that assumed by the tire when inflated and out of contact with the ground and that when in contact with the ground.

2. A tire casing comprising a plurality of plies of fibrous material, separated by intervening layers of an elastic substance, and having a substantially oval or elliptical outline in cross-section when not inflated, the longer axis of the oval being parallel with the axis of the tire, said plies being arranged to assume a substantially circular cross-section and be displaced laterally relative to each other when inflated, and to assume a flattened cross-section where the casing is in contact with the ground, with said plies displaced in the opposite direction from that when inflated.

3. A tire casing comprising a plurality of fabric plies separated by layers of vulcanized rubber, said rubber layers being free from shearing stresses when the tire is in a cross-sectional shape midway between its inflated shape and the shape assumed by the portion in contact with the ground.

4. A tire casing comprising a plurality of fabric plies separated by layers of vulcanized rubber, said rubber layers being free from shearing stresses when the cross-sectional shape of the tire is elliptical, the elliptical shape being midway between the inflated shape of the tire and the shape assumed by the portion in contact with the ground.

Signed at New York, N. Y., May 3d, 1915.

GEORGE F. FISHER.